(12) United States Patent
Jiang et al.

(10) Patent No.: US 11,352,010 B2
(45) Date of Patent: Jun. 7, 2022

(54) OBSTACLE PERCEPTION CALIBRATION SYSTEM FOR AUTONOMOUS DRIVING VEHICLES

(71) Applicants: Baidu USA LLC, Sunnyvale, CA (US); Baidu.com Times Technology (Beijing) Co., Ltd., Beijing (CN)

(72) Inventors: Shu Jiang, Sunnyvale, CA (US); Qi Luo, Sunnyvale, CA (US); Jinghao Miao, Sunnyvale, CA (US); Jiangtao Hu, Sunnyvale, CA (US); Jiaxuan Xu, Sunnyvale, CA (US); Jingao Wang, Sunnyvale, CA (US); Yu Wang, Sunnyvale, CA (US); Jinyun Zhou, Sunnyvale, CA (US); Runxin He, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 293 days.

(21) Appl. No.: 16/588,693

(22) Filed: Sep. 30, 2019

(65) Prior Publication Data
US 2021/0094550 A1    Apr. 1, 2021

(51) Int. Cl.
| | |
|---|---|
| B60W 40/02 | (2006.01) |
| B60W 50/00 | (2006.01) |
| G01S 7/497 | (2006.01) |
| G01S 17/87 | (2020.01) |
| G01S 17/93 | (2020.01) |
| G05D 1/00 | (2006.01) |
| G05D 1/02 | (2020.01) |

(52) U.S. Cl.
CPC ............ *B60W 40/02* (2013.01); *B60W 50/00* (2013.01); *G01S 7/497* (2013.01); *G01S 17/87* (2013.01); *G01S 17/93* (2013.01); *G05D 1/0088* (2013.01); *G05D 1/027* (2013.01); *G05D 1/0278* (2013.01); *B60W 2050/0088* (2013.01); *G05D 2201/0213* (2013.01)

(58) Field of Classification Search
CPC ................. B60W 40/02; B60W 50/00; B60W 2050/0088; B60W 40/10; B60W 10/20; G01S 7/497; G01S 17/87; G01S 17/93; G01S 17/86; G01S 7/4972; G01S 17/931; G05D 1/0088; G05D 1/027; G05D 1/0278; G05D 2201/0213; G05D 1/0248
See application file for complete search history.

(56) References Cited

U.S. PATENT DOCUMENTS

| | | | |
|---|---|---|---|
| 2017/0274855 A1* | 9/2017 | Laskey | ................ B60K 17/165 |
| 2018/0052000 A1* | 2/2018 | Larner | ............... G01C 21/3484 |
| 2019/0220011 A1* | 7/2019 | Della Penna | ............. G06F 8/65 |

* cited by examiner

*Primary Examiner* — Marthe Y Marc-Coleman
(74) *Attorney, Agent, or Firm* — Womble Bond Dickinson (US) LLP

(57) ABSTRACT

In one embodiment, an autonomous driving system of an autonomous driving vehicle perceives a driving environment surrounding the autonomous driving vehicle traveling along a path, including perceiving an obstacle in the driving environment. The system detects a vertical acceleration of the autonomous driving vehicle based on sensor data obtained from a sensor on the autonomous driving vehicle. The system further calibrates the perceived obstacle based on the vertical acceleration of the autonomous driving vehicle. The system then controls the autonomous driving vehicle to navigate through the driving environment in view of the calibrated perceived obstacle.

20 Claims, 9 Drawing Sheets

OBSTACLE PERCEPTION CALIBRATION SYSTEM FOR AUTONOMOUS DRIVING VEHICLES

TECHNICAL FIELD

Embodiments of the present disclosure relate generally to operating autonomous vehicles. More particularly, embodiments of the disclosure relate to calibrating an obstacle perception system for autonomous driving vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving and as part of motion planning and control, the environment surrounding the autonomous driving vehicle as the vehicle is traveling along a path, is needed by the vehicle to safely navigate the path. However, it is difficult to get an accurate perception of the surrounding environment due to the complexity of the surroundings including obstacles and the limitations of perception sensors such as LIDAR and cameras. Such perception of the environment depends on the appended sensors on vehicles such as LIDAR and cameras. The environment such as obstacles might have changing sizes, shapes, and types due to the inaccuracy of the appended sensor and complexity of the surroundings. The perceived obstacle size, shape and even type changes between time frames. This uncertainty causes potential issues in succeeding modules, such as prediction, planning, and control modules.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
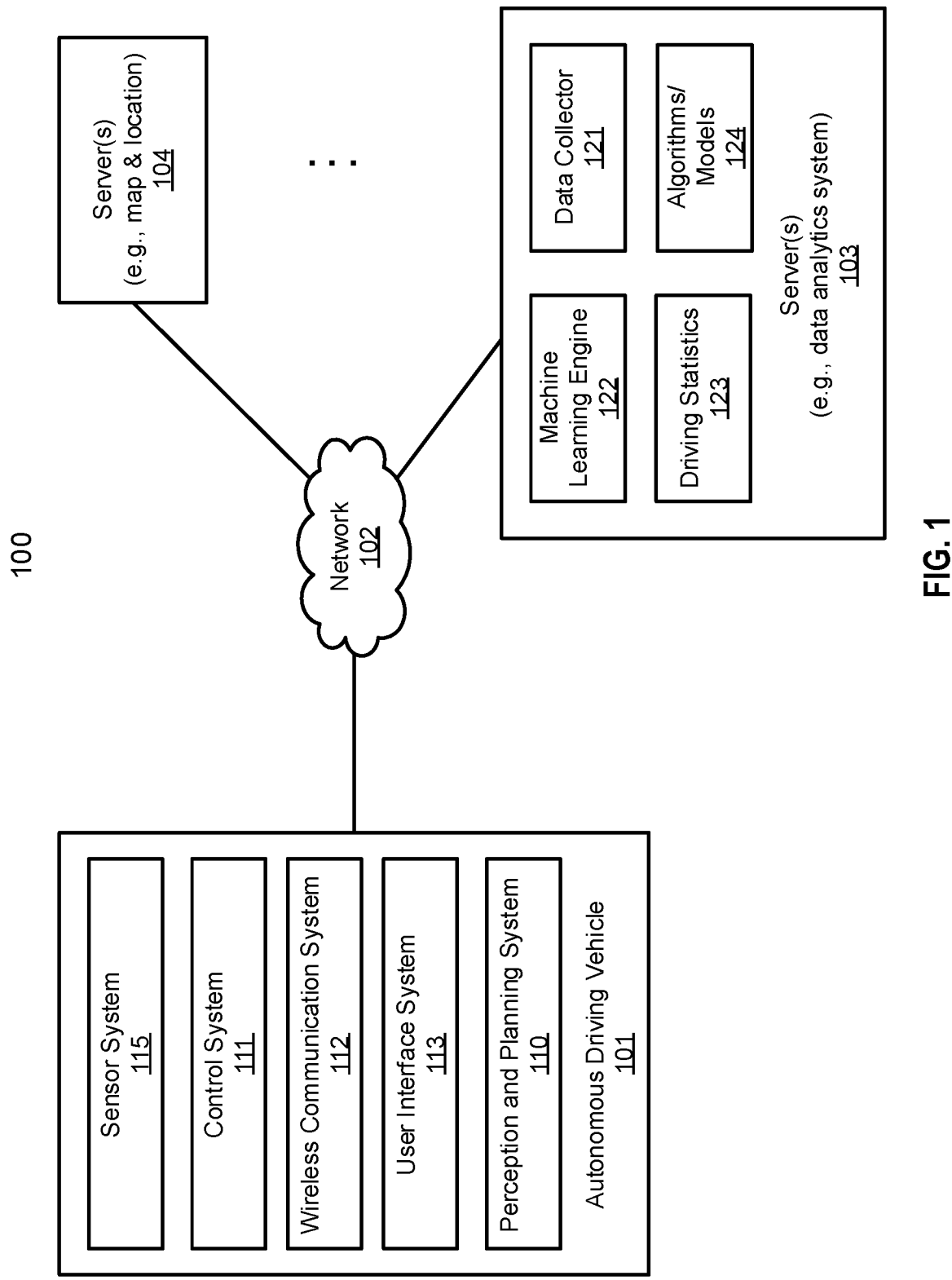
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, instead of adding more perception sensors, which are delicate and expensive, to vehicles, other sensors from the vehicle itself, such as IMU, GPS, tire pressure sensor, and dynamic suspension system sensor are used to improve the obstacle perception system. According to one aspect, the acceleration in vertical direction (z-direction) can be measured from an IMU or GPS or be calculated from a tire pressure sensor and suspension sensor. This vertical acceleration is served as an extra input to the obstacle perception system for auto-correction. When a certain static obstacle is chosen as references, the fusion of other surrounding obstacles provides a more accurate result. For example, if an obstacle such as a car is perceived by the obstacle perception system as a triangular shape, the vertical acceleration will identify or verify the relative movement of the missing vertex, which in turn corrects the perception result.

According to one embodiment, an autonomous driving system of an autonomous driving vehicle perceives a driving environment surrounding the autonomous driving vehicle traveling along a path, including perceiving an obstacle in the driving environment. The system detects a vertical acceleration of the autonomous driving vehicle based on sensor data obtained from a sensor on the autonomous driving vehicle. The system further calibrates the perceived obstacle based on the vertical acceleration of the autonomous driving vehicle. The system then controls the autonomous driving vehicle to navigate through the driving environment in view of the calibrated perceived obstacle.

In one embodiment, calibrating the perceived obstacle includes determining a shape of the perceived obstacle based on the calibrated perceived obstacle. The sensor on the autonomous driving vehicle includes an inertial measurement unit (IMU), a global positioning system (GPS), a tire pressure sensor, or a vehicle suspension sensor. Perceiving the obstacle includes detecting the obstacle using a light detection and range (LIDAR) device and a camera.

In one embodiment, calibrating the perceived obstacle includes obtaining a first image captured at a first point in time by a first sensor of the autonomous driving vehicle, the first image capturing at least a portion of the obstacle, determining a second point in time in response to detecting the vertical acceleration, and calibrating the obstacle based on the first image and a second image captured at the second point in time, the second image capturing at least a portion of the obstacle. The first image and the second image are captured by at least one of a LIDAR device or a camera, and wherein the vertical acceleration is detected by at least one of an IMU or a GPS device. The second image contains at least one feature of the obstacle that is absent from the first image, and wherein the at least one feature of the second image is utilized to compensate the first image to determine a shape of the obstacle. The first image represents a two-dimensional (2D) view of the obstacle and the second image includes an additional edge of the obstacle representing a depth of the obstacle that is absent from the first image.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
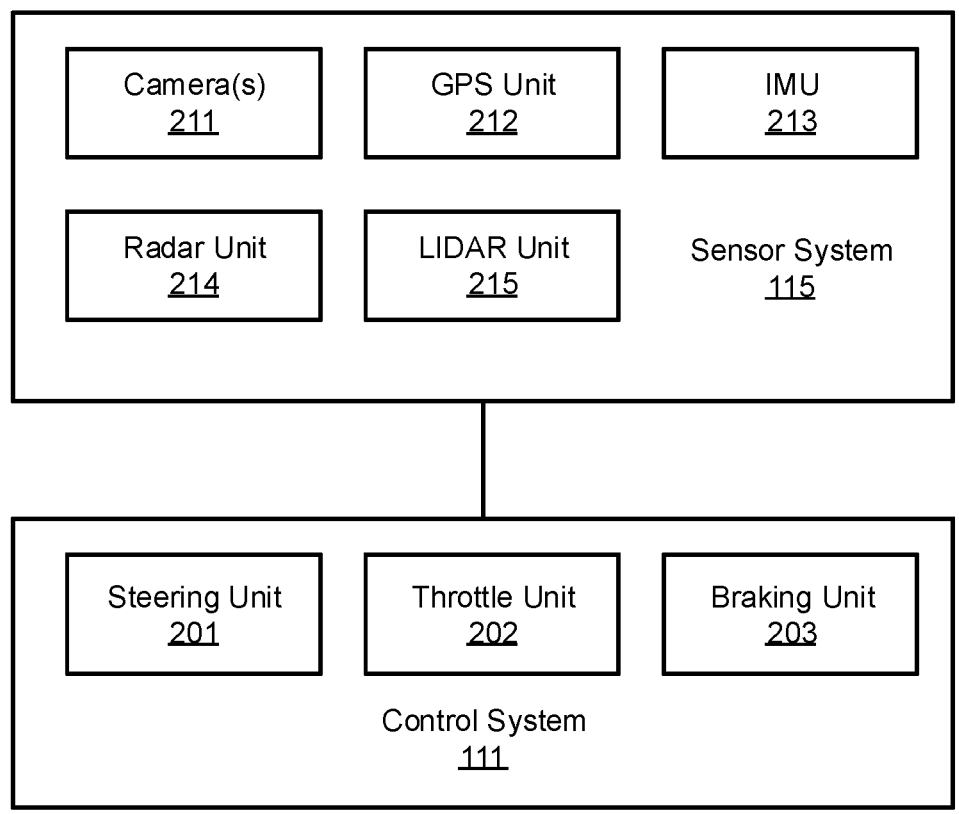
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. Algorithms 124 may include an algorithm for determining vertical acceleration or dimension based on sensor data of certain sensors such as IMU and GPS sensors. Algorithms 124 can then be uploaded on ADVs to be utilized during autonomous driving in real-time.

Figure 3A:
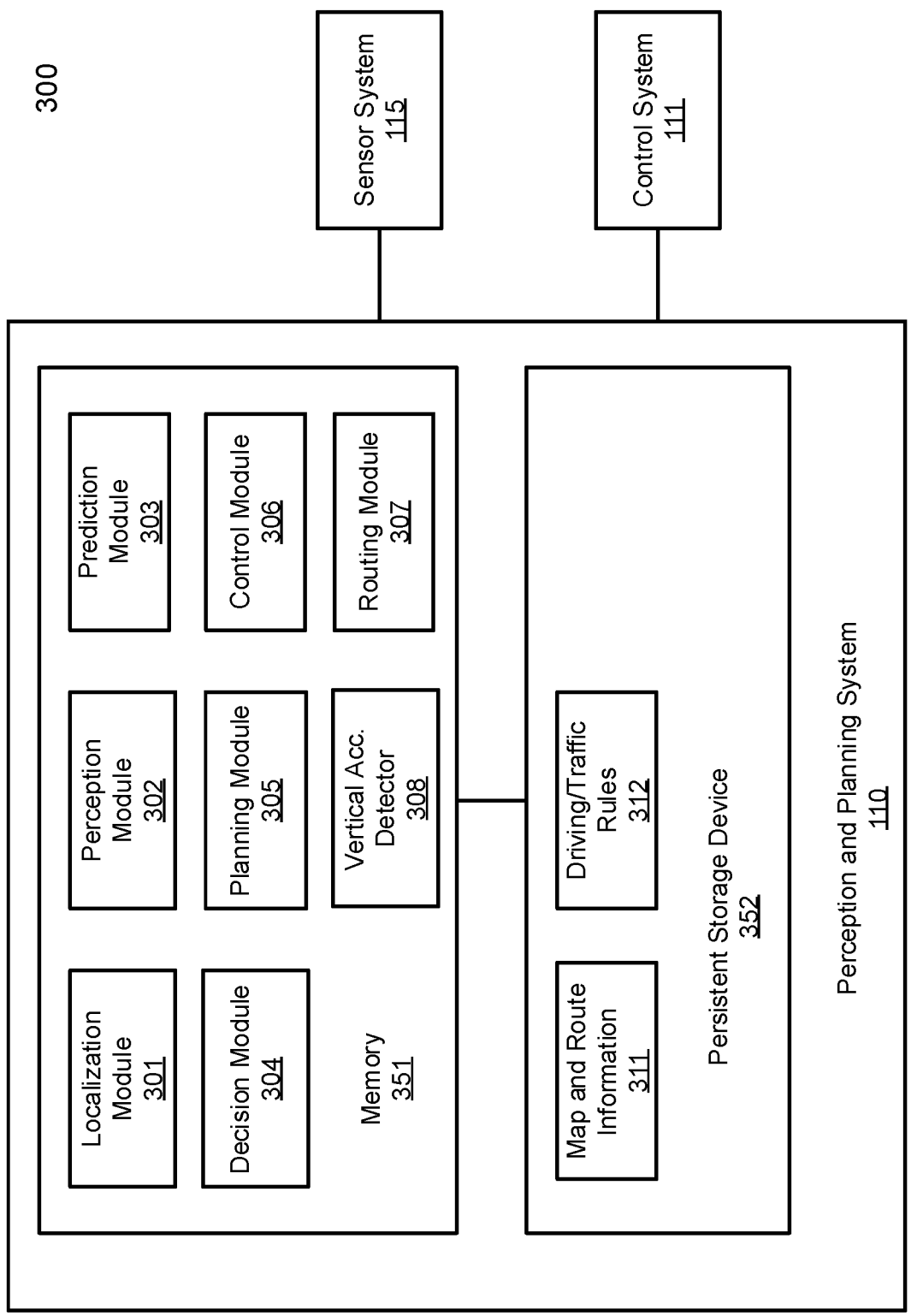
FIGS. 3A-3B are block diagrams illustrating an example of a perception and planning system used with an autonomous vehicle according to one embodiment.
Figure 3B:
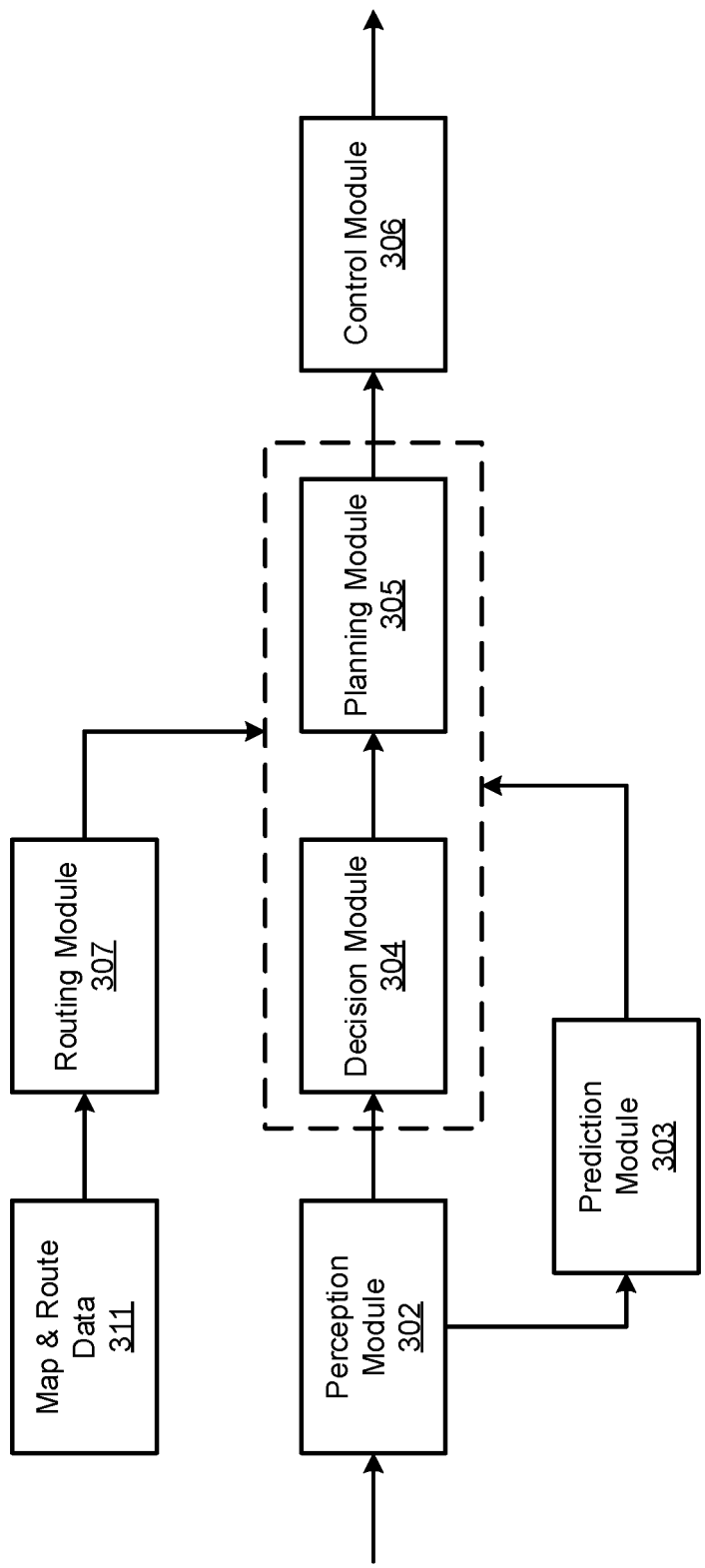

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition.

That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

According to one embodiment, vertical acceleration detector 308 is configured to detect the vertical acceleration or vertical movement of a vehicle. The vertical acceleration detector 308 may be implemented as a part of perception module 302. The vertical acceleration detector 308 may be coupled to a sensor capable of detecting vertical acceleration or vertical movement of a vehicle, such as, for example, IMU, GPS, tire pressure sensor, and/or vehicle suspension sensor, etc. Once the vertical acceleration or vertical movement of the vehicle is detected, perception module 302 is to perceive an obstacle such as a physical shape of the obstacle based on the vertical acceleration or vertical movement of the vehicle.

For example, perception module 302 can identify an image captured at a point in time corresponding to the vertical acceleration (e.g., captured when driving on an uneven, upward curved surface, or a surface with a bump) and use that image to calibrate an obstacle captured by another image captured at a different point in time (e.g., captured when driving on a flat surface).

Figure 4:
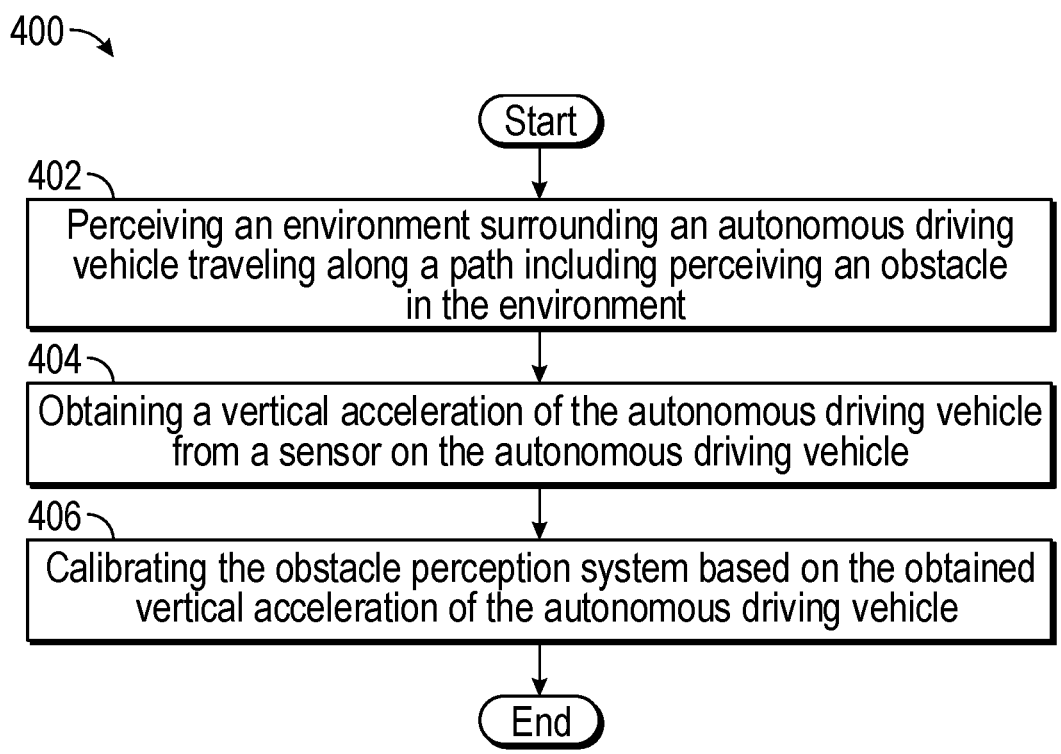
FIG. 4 is a flow diagram of a method of calibrating an obstacle perception system for an autonomous driving vehicle according to one embodiment.

FIG. 4 is a flow diagram of a method 400 of calibrating an obstacle perception system for an autonomous driving vehicle according to one embodiment. Method 400 may be performed by processing logic which may include software, hardware, or a combination thereof. For example, method 400 may be performed by one or more modules (e.g., perception module 302) in FIG. 3A or a data processing system shown in FIG. 6. In one embodiment, method 400 may be performed as part of an off-line simulation mode.

Continuing with FIG. 4, method 400 includes at operation 402, perceiving an environment surrounding an autonomous driving vehicle traveling along a path including perceiving an obstacle in the environment, at operation 404, obtaining a vertical acceleration of the autonomous driving vehicle from a sensor on the autonomous driving vehicle, and at operation 406, calibrating the obstacle perception system based on the obtained vertical acceleration of the autonomous driving vehicle. In one embodiment, a vertical displacement of the vehicle may be obtained to calibrate the obstacle perception based on the obtained vertical displacement.

Figure 5:
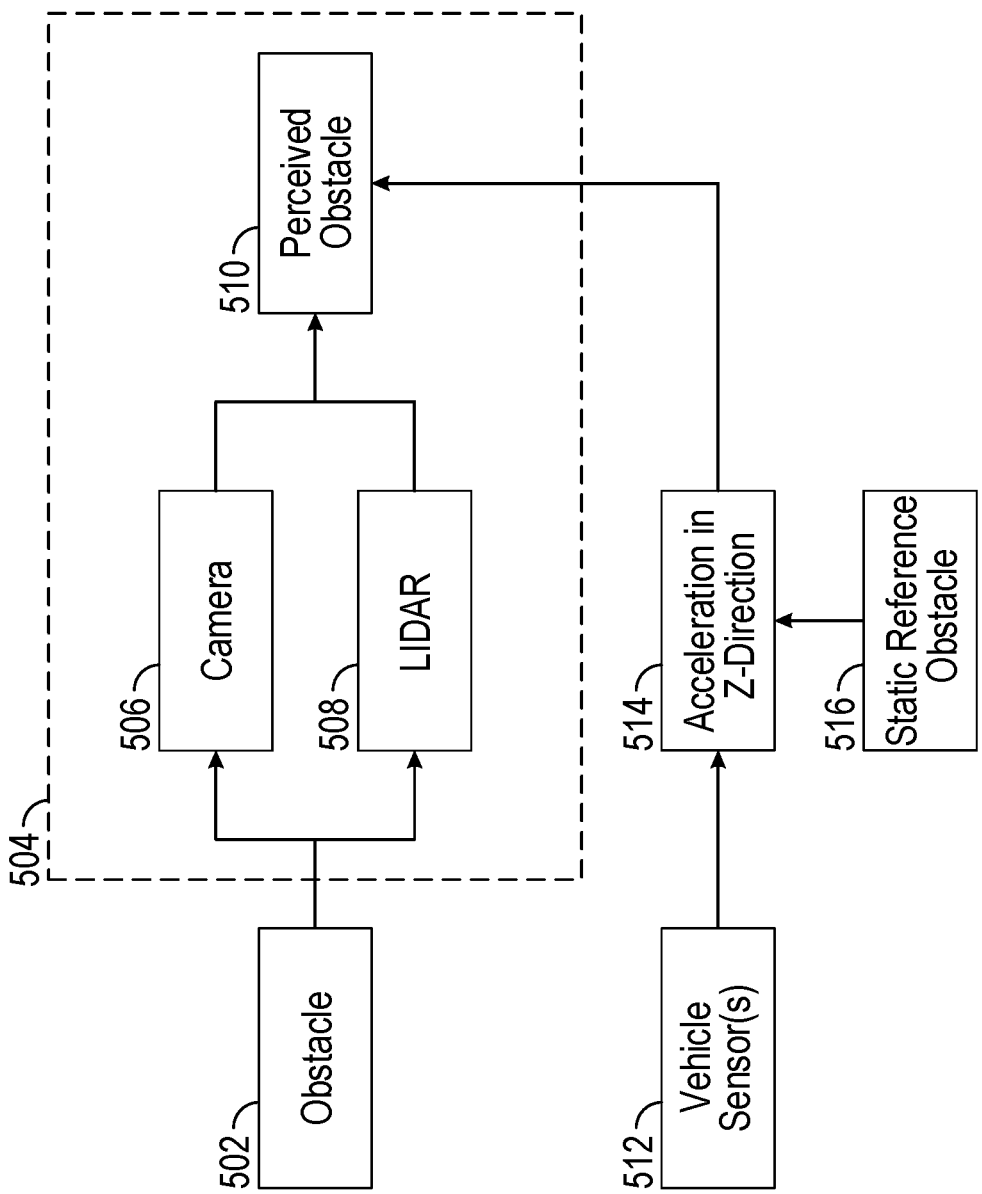
FIG. 5 is a block diagram illustrating an obstacle perception system receiving a vehicle's vertical acceleration as an input according to one embodiment.

FIG. 5 is a block diagram illustrating an obstacle perception system receiving a vehicle's vertical acceleration as an input according to one embodiment. An obstacle perception system 504 includes perception sensors such as a camera 506 and a LIDAR 508 which may correspond to camera 211 and LIDAR unit 215, respectively, shown in FIG. 2. Obstacle perception system 504 further includes a perception module 510 which may correspond to perception module 302 shown in FIG. 3A. Obstacle perception system 540 perceives the environment surrounding an autonomous driving vehicle while the vehicle is traveling along a path and the environment includes one or more obstacles 502.

Obstacles 502 may include a vehicle such as a car, buildings, bicycles, motorcycles, animals, and pedestrians. In FIG. 5, one obstacle 502 is shown to simplify the explanation of aspects of the invention. An obstacle, such as a car, may be perceived by camera 506 and/or LIDAR 508 and a perceived obstacle may be obtained by perception module 510. In one embodiment, a vertical acceleration (z-direction) of the autonomous driving vehicle is used as an input to perception module 510 to auto-correct the perceived obstacle. A vehicle sensor 512 may be used to obtain the vertical acceleration of the autonomous driving vehicle in the z-direction.

For example, an inertial measurement unit (IMU) on the vehicle may be used to measure and output the vertical acceleration. Other non-perception sensors such as a global positioning system (GPS), a tire pressure sensor, or a vehicle suspension sensor may be used to obtain the vertical acceleration. In the example of the tire pressure sensor or the vehicle suspension sensor, the vertical acceleration is calculated rather than measured as in the case of the IMU and GPS. The vertical acceleration (measured or calculated) is provided as an additional input to obstacle perception system 504 for auto-correction. In one embodiment, auto-correction includes using the z-direction information to verify, confirm, or remove or correct an error of perceiving an obstacle by the perception module. When a certain static obstacle 516 is chosen as a reference, the fusion of other surrounding obstacles provides a more accurate result of the perceived obstacle. For example, if at z=3 m the perception result of a static obstacle is a triable, while at z=2 m the perception result of the static obstacle is a cubic, it is likely something is wrong at z=3 m perception result. In another example, if an obstacle such as a car is perceived by obstacle perception system 504 as a triangular shape, the vertical acceleration will identify the relative movement of the missing vertex, which in turn corrects the perception result.

Figure 6A:
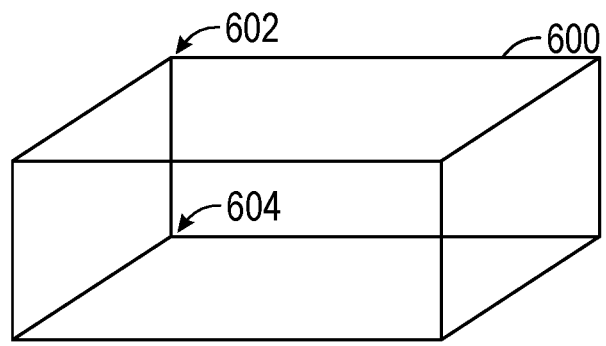
FIGS. 6A and 6B are illustrations of various representations of a perceived obstacle by an obstacle perception system according to one embodiment.
Figure 6B:
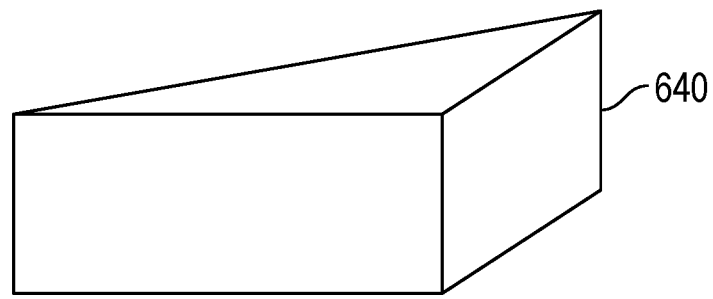

FIGS. 6A and 6B are illustrations of various representations of a perceived obstacle by an obstacle perception system according to one embodiment. In FIG. 6A, a rectangular-shaped box 600 represents an obstacle such as a car and such a rectangular-shaped box 600 is provided or displayed by obstacle perception system 504 to a user while the obstacle perception system is being simulated or tested. Rectangular-shaped box 600 or other suitable shapes may accurately represent the perceived obstacle. However, because of the complexities of the surrounding obstacles, the perceived obstacle (e.g., a car) may not be perceived as a rectangular-shaped box but rather a triangular-shaped box 640 shown in FIG. 6B. Such a triangular-shaped box 640 is missing the vertices 602 and 604 shown in the rectangular-shaped box 600 of FIG. 6A and hence, is perceived as a triangular-shaped box 640 which is not an accurate perception result of the same obstacle such as a car.

For example, if an obstacle such as a car is perceived by obstacle perception system 504 as the triangular-shaped box 640, the vertical acceleration provided as an additional input to the obstacle perception system will identify the relative movement of the missing vertex or vertices, which in turn corrects the perception result. In one embodiment, calibrating the obstacle perception system based on the obtained vertical acceleration of the autonomous driving vehicle includes rejecting a shape representing the perceived obstacle based on a predefined shape representing the obstacle. The rejected shape may be triangular-shaped box 640 and the predefined shape representing the obstacle may be rectangular-shaped box 600.

Figure 7A:
FIGS. 7A and 7B are illustrations of various representations of a perceived obstacle by an obstacle perception system according to one embodiment.
Figure 7B:
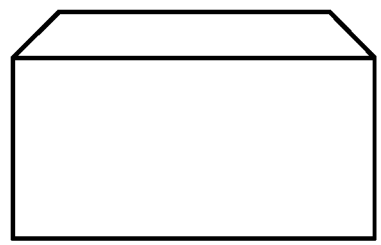

In another example, if the perception module perceives an obstacle in a two-dimensional (2D) shape as shown in FIG. 7A. A vertical acceleration of the vehicle may help identifying or determining the depth of the obstacle as shown in FIG. 7B, which in turns determines the actual shape in a three-dimensional (3D) shape. Thus, the vertical dimension information is utilized to assist the perception of an obstacle.

For example, when an ADV is driving a flat surface of a road and perceives an obstacle (e.g., an obstacle such as a parked vehicle or a moving vehicle), a sensor such as a camera or LIDAR of the ADV captures a first image. But due to the mounting position of the sensor of the ADV, the first image (e.g., FIG. 7A) may only capture a side view of the obstacle in a 2D view. Thus, the autonomous driving system of the ADV may not accurately capture the shape of the obstacle. Subsequently, when the ADV is driving on an uneven surface of the road, such as jump up compared to the flat surface, the vertical acceleration (e.g., the jumping motion of the vehicle) is detected by the system. Meanwhile, the sensor (e.g., camera, LIDAR) keeps capturing images of the driving environment, including a second image (e.g., FIG. 7B) when the vehicle jumps upwardly. The second image may capture additional information about the obstacle, such as at least a portion of the top surface of the object. Such additional information can compensate the first image in determining the shape of the obstacle (e.g., the depth of the obstacle) to complete a 3D perception of the obstacle.

Figure 8:
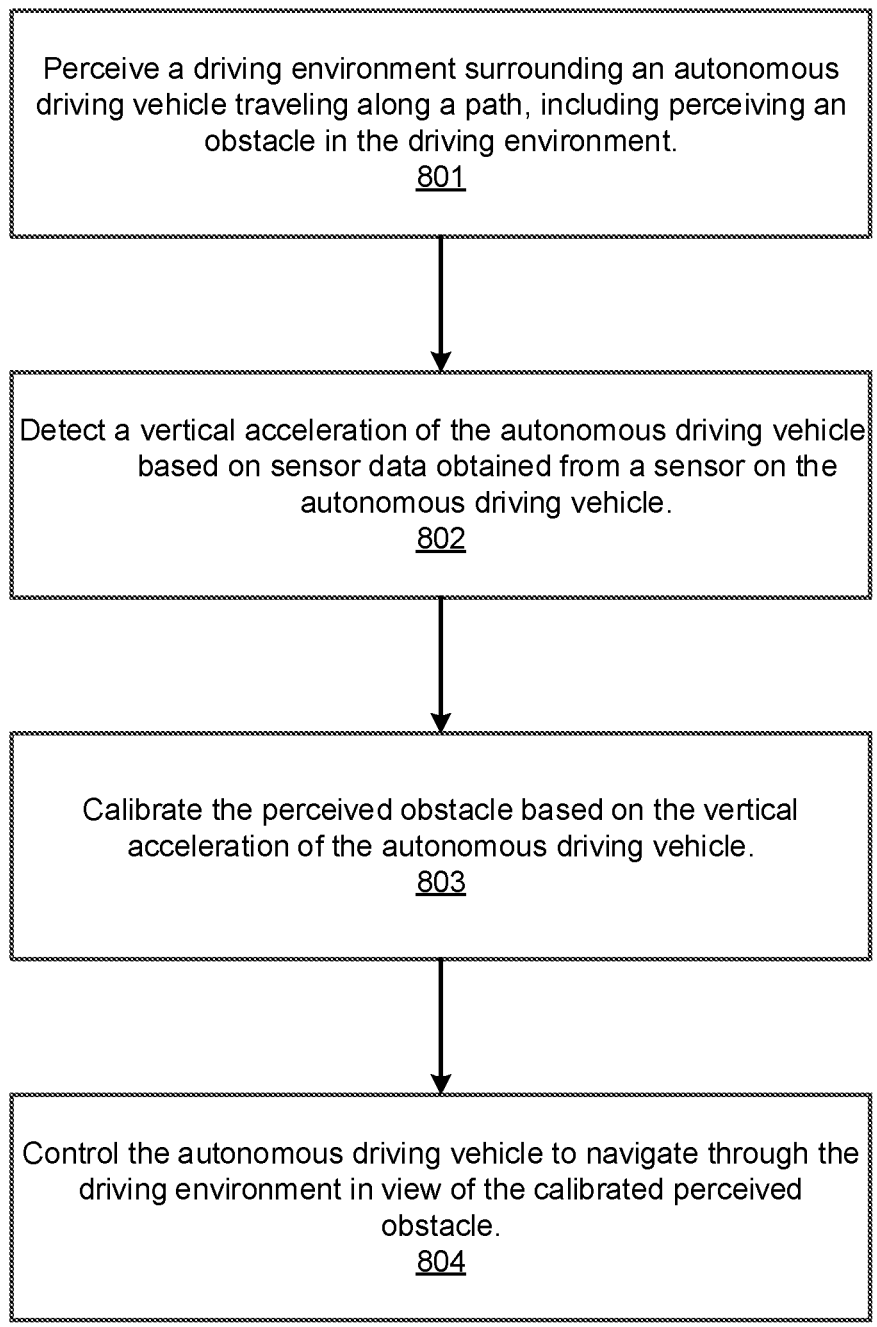
FIG. 8 is a flow diagram illustrating an example of a process of calibrating perception of an autonomous driving system according to one embodiment.

FIG. 8 is a flow diagram illustrating an example of a process of calibrating perception of an autonomous driving system according to one embodiment. Process 800 may be performed by processing logic which may include software, hardware, or a combination thereof. Referring to FIG. 8, at block 801, processing logic perceives a driving environment surrounding an autonomous driving vehicle traveling along a path, including perceiving an obstacle in the driving environment. At block 802, a vertical acceleration of the autonomous driving vehicle is detected based on sensor data obtained from a sensor on the autonomous driving vehicle. At block 803, processing logic calibrates the perceived obstacle based on the vertical acceleration of the autonomous driving vehicle. At block 804, processing logic controls the autonomous driving vehicle to navigate through the driving environment in view of the calibrated perceived obstacle.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for calibrating a perception system of an autonomous driving vehicle, the method comprising:
    perceiving a driving environment surrounding an autonomous driving vehicle traveling along a path, including perceiving an obstacle in the driving environment;
    detecting a vertical acceleration of the autonomous driving vehicle based on sensor data obtained from a sensor on the autonomous driving vehicle;
    calibrating the perceived obstacle based on the vertical acceleration of the autonomous driving vehicle; and
    controlling the autonomous driving vehicle to navigate through the driving environment in view of the calibrated perceived obstacle.

2. The method of claim 1, wherein calibrating the perceived obstacle includes determining a shape of the perceived obstacle based on the calibrated perceived obstacle.

3. The method of claim 1, wherein the sensor on the autonomous driving vehicle includes an inertial measurement unit (IMU), a global positioning system (GPS), a tire pressure sensor, or a vehicle suspension sensor.

4. The method of claim 3, wherein perceiving the obstacle includes detecting the obstacle using a light detection and range (LIDAR) device and a camera.

5. The method of claim 1, wherein calibrating the perceived obstacle based on the vertical acceleration comprises:
    obtaining a first image captured at a first point in time by a first sensor of the autonomous driving vehicle, the first image capturing at least a portion of the obstacle;
    determining a second point in time in response to detecting the vertical acceleration; and
    calibrating the obstacle based on the first image and a second image captured at the second point in time, the second image capturing at least a portion of the obstacle.

6. The method of claim 5, wherein the first image and the second image are captured by at least one of a LIDAR device or a camera, and wherein the vertical acceleration is detected by at least one of an IMU or a GPS device.

7. The method of claim 5, wherein the second image contains at least one feature of the obstacle that is absent from the first image, and wherein the at least one feature of the second image is utilized to compensate the first image to determine a shape of the obstacle.

8. The method of claim 7, wherein the first image represents a two-dimensional (2D) view of the obstacle and the second image includes an additional edge of the obstacle representing a depth of the obstacle that is absent from the first image.

9. A non-transitory machine-readable medium having instructions stored therein, which when executed by a processor, cause the processor to perform a method for calibrating a perception system of an autonomous driving vehicle, the method comprising:
    perceiving a driving environment surrounding an autonomous driving vehicle traveling along a path, including perceiving an obstacle in the driving environment;
    detecting a vertical acceleration of the autonomous driving vehicle based on sensor data obtained from a sensor on the autonomous driving vehicle;
    calibrating the perceived obstacle based on the vertical acceleration of the autonomous driving vehicle; and controlling the autonomous driving vehicle to navigate through the driving environment in view of the calibrated perceived obstacle.

10. The machine-readable medium of claim 9, wherein calibrating the perceived obstacle includes determining a shape of the perceived obstacle based on the calibrated perceived obstacle.

11. The machine-readable medium of claim 9, wherein the sensor on the autonomous driving vehicle includes an inertial measurement unit (IMU), a global positioning system (GPS), a tire pressure sensor, or a vehicle suspension sensor.

12. The machine-readable medium of claim 11, wherein perceiving the obstacle includes detecting the obstacle using a light detection and range (LIDAR) device and a camera.

13. The machine-readable medium of claim 9, wherein calibrating the perceived obstacle based on the vertical acceleration comprises:
obtaining a first image captured at a first point in time by a first sensor of the autonomous driving vehicle, the first image capturing at least a portion of the obstacle;
determining a second point in time in response to detecting the vertical acceleration; and
calibrating the obstacle based on the first image and a second image captured at the second point in time, the second image capturing at least a portion of the obstacle.

14. The machine-readable medium of claim 13, wherein the first image and the second image are captured by at least one of a LIDAR device or a camera, and wherein the vertical acceleration is detected by at least one of an IMU or a GPS device.

15. The machine-readable medium of claim 13, wherein the second image contains at least one feature of the obstacle that is absent from the first image, and wherein the at least one feature of the second image is utilized to compensate the first image to determine a shape of the obstacle.

16. The machine-readable medium of claim 15, wherein the first image represents a two-dimensional (2D) view of the obstacle and the second image includes an additional edge of the obstacle representing a depth of the obstacle that is absent from the first image.

17. A data processing system, comprising:
a processor; and
a memory coupled to the processor to store instructions, which when executed by the processor, cause the processor to perform a method for calibrating a perception system of an autonomous driving vehicle, the method comprising:
perceiving a driving environment surrounding an autonomous driving vehicle traveling along a path, including perceiving an obstacle in the driving environment,
detecting a vertical acceleration of the autonomous driving vehicle based on sensor data obtained from a sensor on the autonomous driving vehicle,
calibrating the perceived obstacle based on the vertical acceleration of the autonomous driving vehicle, and
controlling the autonomous driving vehicle to navigate through the driving environment in view of the calibrated perceived obstacle.

18. The system of claim 17, wherein calibrating the perceived obstacle includes determining a shape of the perceived obstacle based on the calibrated perceived obstacle.

19. The system of claim 17, wherein the sensor on the autonomous driving vehicle includes an inertial measurement unit (IMU), a global positioning system (GPS), a tire pressure sensor, or a vehicle suspension sensor.

20. The system of claim 19, wherein perceiving the obstacle includes detecting the obstacle using a light detection and range (LIDAR) device and a camera.

* * * * *